US012026135B1

(12) United States Patent
    Khanna et al.

(10) Patent No.: US 12,026,135 B1
(45) Date of Patent: Jul. 2, 2024

(54) BANK DATA QUALITY ENGINE PLATFORM

(71) Applicant: United Services Automobile Association (USAA), San Antonio, TX (US)

(72) Inventors: Rina Khanna, Frisco, TX (US); Prabhakar Swarna, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 18 days.

(21) Appl. No.: 17/733,281

(22) Filed: Apr. 29, 2022

(51) Int. Cl.
    *G06F 16/215* (2019.01)
    *G06F 11/07* (2006.01)
    *G06F 16/16* (2019.01)

(52) U.S. Cl.
    CPC .......... *G06F 16/215* (2019.01); *G06F 11/07* (2013.01); *G06F 16/168* (2019.01)

(58) Field of Classification Search
    CPC ....... G06F 16/215; G06F 11/07; G06F 16/168
    See application file for complete search history.

(56) References Cited

U.S. PATENT DOCUMENTS

| 11,170,022 | B1* | 11/2021 | Gu | G06F 16/258 |
| 2002/0198765 | A1* | 12/2002 | Magrino | G06Q 10/06 705/7.42 |
| 2016/0070725 | A1* | 3/2016 | Marrelli | G06F 16/24578 707/692 |
| 2020/0250747 | A1* | 8/2020 | Padmanabhan | G06Q 20/389 |
| 2021/0144440 | A1* | 5/2021 | Li | H04N 21/26208 |
| 2022/0283995 | A1* | 9/2022 | Hakami | G06F 11/327 |
| 2022/0319312 | A1* | 10/2022 | Mintz | G06Q 30/0224 |

\* cited by examiner

*Primary Examiner* — Angelica Ruiz
(74) *Attorney, Agent, or Firm* — Fletcher Yoder, P.C.

(57) ABSTRACT

A data management system includes a computing device. The computing device includes one or more processors to execute instructions stored in memory of the computing device. The instructions, when executed by the computer device, cause the computing device to receive an indication that multiple data elements are ready for evaluation, as well as determine whether metadata registration for the multiple data elements is valid. The instructions also cause the computing device to determine a data quality of the multiple data elements by evaluating multiple data elements based on multiple data quality dimensions including at least two of: validity, completeness, uniqueness, accuracy, consistency, and timeliness. The instructions also cause the computing device to provide an indication of the data quality of the multiple data elements via a graphical user interface (GUI) generated via a centralized data mart.

20 Claims, 8 Drawing Sheets

FIG. 4

Company Data Quality - Failed/CDE Rules/Results

| Date | Database | Table | Column | Information | Failed Value | Key Column | Key Value | Dimension Level | Argument Text | Rule Set Name | Rule Name | Rule Description | SQL Query |
|---|---|---|---|---|---|---|---|---|---|---|---|---|---|
| 1/10/2021 | PBKGPDM... | M_BDPDM... | SRCE_PRO... | Bank Deposit | 000 | ARG_DEM_DEP_S... | 248868717 | INTEGRITY | values|0 | PBKGPDMDB... | DD_BK_NULL_GRTR... | Value should be greater than a specified argument | SQL Query |
| | | | | | | | 264715263 | INTEGRITY | values|0 | PBKGPDMDB... | DD_BK_NULL_GRTR... | Value should be greater than a specified argument | SQL Query |
| | | | | | | | 313380210 | INTEGRITY | values|0 | PBKGPDMDB... | DD_BK_NULL_GRTR... | Value should be greater than a specified argument | SQL Query |
| 1/9/2021 | PBKGPDM... | M_BDPDM... | SRCE_PRO... | Bank Deposit | 000 | ARG_DEM_DEP_S... | 248868717 | INTEGRITY | values|0 | PBKGPDMDB... | DD_BK_NULL_GRTR... | Value should be greater than a specified argument | SQL Query |
| | | | | | | | 264715263 | INTEGRITY | values|0 | PBKGPDMDB... | DD_BK_NULL_GRTR... | Value should be greater than a specified argument | SQL Query |
| | | | | | | | 313380210 | INTEGRITY | values|0 | PBKGPDMDB... | DD_BK_NULL_GRTR... | Value should be greater than a specified argument | SQL Query |
| 1/8/2021 | PBKDMDB... | M_MDS_FC... | UTILIZATIO... | Debt Protection | 103.51 | AGENT_AGG_SCO... | 2082319 | INTEGRITY | low_value|0|high_value|100 | PBKGPDMDB... | DD_BK_Numeric_Ra... | Value should be between specified low and high values | SQL Query |
| | | | | | | | 2082421 | INTEGRITY | low_value|0|high_value|100 | PBKGPDMDB... | DD_BK_Numeric_Ra... | Value should be between specified low and high values | SQL Query |
| | | | | | | | 2082487 | INTEGRITY | low_value|0|high_value|100 | PBKGPDMDB... | DD_BK_Numeric_Ra... | Value should be between specified low and high values | SQL Query |
| | PBKGPDM... | M_BCC_DM... | CHD_ORIG... | Credit Card | 1984-11-01 | ART_CRED_CARD... | 5255475454 | INTEGRITY | since_year|1985|to_year|Y | PBKGPDMDB... | DD_BK_NO_FUTUR... | Value should be date between the predefined date range | SQL Query |
| | | | | | | | 5255475454 | INTEGRITY | since_year|1985|to_year|Y | PBKGPDMDB... | DD_BK_NO_FUTUR... | Value should be date between the predefined date range | SQL Query |
| | | | | | | | 5255475454 | INTEGRITY | since_year|1985|to_year|Y | PBKGPDMDB... | DD_BK_NO_FUTUR... | Value should be date between the predefined date range | SQL Query |
| | | | | | | | 5255475454 | INTEGRITY | since_year|1985|to_year|Y | PBKGPDMDB... | DD_BK_NO_FUTUR... | Value should be date between the predefined date range | SQL Query |
| | | | | | | | 5255475454 | INTEGRITY | since_year|1985|to_year|Y | PBKGPDMDB... | DD_BK_NO_FUTUR... | Value should be date between the predefined date range | SQL Query |
| | | | | | 1984-12-01 | ART_CRED_CARD... | 5255475454 | INTEGRITY | since_year|1985|to_year|Y | PBKGPDMDB... | DD_BK_NO_FUTUR... | Value should be date between the predefined date range | SQL Query |
| | | | | | | | 5255475454 | INTEGRITY | since_year|1985|to_year|Y | PBKGPDMDB... | DD_BK_NO_FUTUR... | Value should be date between the predefined date range | SQL Query |
| | | | CHD_USER... | | LOWRITE | ART_CRED_CARD... | 5255475457 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475458 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475454 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475454 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475454 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475454 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475465 | INTEGRITY | values|{'PREMM','SECRC... | PBKGPDMDB... | DD_BK_SPACES_O... | Credit card Product is defined it should be {premm, secrod, educed} | SQL Query |
| | | | | | | | 5255475453 | INTEGRITY | null|NULL | PBKGPDMDB... | DD_BK_SPACES_O... | Credit card Product is defined it should be {premm, secrod, educed} | SQL Query |
| | M_BCC_DM... | | PRIM_ADD... | Credit Card | | ORG_CRCD_APPL... | 196630625 | INTEGRITY | values|0 | PBKGPDMDB... | DD_BK_SINTEGER_I... | Value should have exactly 5 digits | SQL Query |
| | M_BDP_DM... | | SRCE_PRO... | Bank Deposit | 000 | ARG_DEM_DEP_S... | 248868717 | INTEGRITY | values|0 | PBKGPDMDB... | DD_BK_NULL_GRTR... | Value should be greater than a specified argument | SQL Query |
| | | | | | | | 264715263 | INTEGRITY | values|0 | PBKGPDMDB... | DD_BK_NULL_GRTR... | Value should be greater than a specified argument | SQL Query |
| | | | | | | | 313380210 | INTEGRITY | values|0 | PBKGPDMDB... | DD_BK_NULL_GRTR... | Value should be greater than a specified argument | SQL Query |
| | M_BDP_FC... | | ATM_FEE... | Bank Deposit | 1.25 | TRN_DEM_DEP_M... | 1498447995 | INTEGRITY | atm_fee_sur_amtlatm_fee... | PBKGPDMDB... | DD_BK_ATM_FEE_S... | Value should be equal to past entry amount or less that 0.03 times than p... | SQL Query |
| | | | | | 2.00 | TRN_DEM_DEP_M... | 1498447995 | INTEGRITY | atm_fee_sur_amtlatm_fee... | PBKGPDMDB... | DD_BK_ATM_FEE_S... | Value should be equal to past entry amount or less that 0.03 times than p... | SQL Query |
| | | | | | | | 1498345491 | INTEGRITY | atm_fee_sur_amtlatm_fee... | PBKGPDMDB... | DD_BK_ATM_FEE_S... | Value should be equal to past entry amount or less that 0.03 times than p... | SQL Query |

*FIG. 7*

BANK DATA QUALITY ENGINE PLATFORM

BACKGROUND

The present disclosure relates generally to utilizing data within an organization. More specifically, the present disclosure relates to systems and methods for improving quality of data as well as improving processes utilizing the data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Data quality may include the condition of data based on various factors, such as accuracy, validity, completeness, consistency, timeliness, uniqueness, and so forth. An organization may measure data quality based on these factors to identify data errors that may be resolved to bring within a quality threshold, as well to assess whether data in its technology systems, business processes, and the like, is operating or providing information as expected. Often, data quality may be linked to business operations and as such, may be critical for business decisions.

Unexpected data quality issues and/or data quality that is below an expected quality threshold for the organization may impact business analyses and predictions, often resulting in business loss, unnecessary expenses to resolve for the unexpected data quality, and so forth, for the organization. Moreover, various groups across the organization may measure data quality differently. In some instances, low data quality may be determined or detected after performing data analysis or using the data in business operations processes. As such, accurately measuring data quality and identifying the quality of the data prior to using it in business operation processes may be difficult.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a data management system includes a computing device. The computing device includes one or more processors to execute instructions stored in memory (e.g., tangible, non-transitory, machine-readable media) of the computing device. The instructions, when executed by the computer device, cause the computing device to receive an indication that multiple data elements are ready for evaluation, as well as determine whether metadata registration for the multiple data elements is valid. The instructions also cause the computing device to determine t the data quality of the multiple data elements by evaluating multiple data quality dimensions as applicable including validity, completeness, uniqueness, accuracy, consistency, and timeliness. The instructions also cause the computing device to provide an indication of the data quality of the multiple data elements via a graphical user interface (GUI) generated via a centralized data mart.

In one embodiment, a method includes receiving, via a processor, an indication that multiple data elements are ready for evaluation. Moreover, the method includes determining, via the processor, whether metadata registration for the multiple data elements is valid. Additionally, the method includes determining, via the processor, the data quality of the multiple data elements by evaluating multiple data quality dimensions as applicable including validity, completeness, uniqueness, accuracy, consistency, and timeliness. Furthermore, the method includes providing, via the processor, a self-service GUI to author data quality rules to be used by data quality analysts and populated to a centralized data mart and generating, via the processor, a self-service dashboard to drive insights. The self-service GUI provides the method to author data quality rules, where the dashboard provides a holistic view of data quality of the multiple data elements.

In one embodiment, one or more tangible, non-transitory, machine-readable media includes instructions that, when executed by one or more processors of the machine, cause the machine to receive an indication that multiple data elements are ready for evaluation. The instructions also cause the machine to determine whether metadata registration for the multiple data elements is valid. Moreover, the instructions cause the machine to determine a data quality of the multiple data elements, based on multiple data quality dimensions including: validity, completeness, uniqueness, accuracy, consistency, and timeliness. Furthermore, the instructions cause the machine to identify one or more anomalies in the data elements that exceed a variance threshold to provide early detection of data quality issues. The instructions also cause the machine to trigger a data validation failure when the one or more anomalies are identified. Additionally, the instructions cause the machine to provide an indication of the data quality of the multiple data elements via a GUI generated via a centralized data mart. Furthermore, the instructions cause the machine to generate a report providing the indication of the data quality of the multiple data elements, where the dashboard provides a holistic view of data quality of the multiple data elements.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 illustrates a block diagram of an anomaly detection dataset dashboard associated with the data quality engine, in accordance with embodiments described herein;

FIG. 7 illustrates a block diagram of a failed critical data element rules and results dashboard associated with the data quality engine, in accordance with embodiments described herein.

DETAILED DESCRIPTION

Figure 1:
FIG. 1 illustrates a block diagram of a data quality engine of an organization, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. As used herein, "data quality" may refer to a measure of the quality of data based on one or more rules, conditions, and/or dimensions. The data quality may indicate how well the data may service an intended purpose. As used herein, "dimensions" may refer to one or more measures that indicate the quality of the data. By way of example, the dimensions for data quality may include accuracy, completeness, consistency, validity, uniqueness, timeliness, and so forth. Additionally, as used herein, "evidencing" refers to the results and recording of the data quality across a data system. As will be discussed herein, evidencing may be displayed on a user interface dashboard, in which the evidencing is centralized on the user interface (e.g., in a single location, such as a single entry page). As used herein, a "data warehouse" may refer to a relational database designed for analytical rather than transaction work, capable of processing and/or transforming data sets from multiple sources. Further, a data "mart" is a curated subset of data, generated for analytics and/or business intelligence use. The data mart may include a repository of pertinent information for a subgroup of information related to a particular use case. A data mart typically holds data warehouse data specific to one or more particular processes, which will be described herein.

As mentioned above, the quality of data may be used to make accurate and informed decisions within an organization. Each piece of data may be associated with a level of quality, for example, based on one or more dimensions (e.g., characteristics, factors, or both) indicative of the data quality. In particular, without expected data quality, an organization may not rely on the data to make informed decisions. In some instances, the organization may utilize low quality data (e.g., data quality below a quality threshold), resulting in misinformed decision making and further resulting in business loss and increased expenses to resolve any consequences associated with the misinformed decision making. Often, low quality data may be utilized within business processes prior to identifying that the data is low quality. As such, utilizing the low-quality data throughout pipelines associated with the business processes may result in inefficient identification of low quality data, as well as result in waiting period to resolve for the low quality data.

Additionally, an organization may utilize data from different sources and evidencing of the data quality may be segmented for each of the sources, as well as across different groups of the organization. For example, the evidencing may be performed separately and manually for each data element and/or asset associated with data elements. As such, accurate and timely evidencing of the data quality across within the organization may be difficult to obtain for making informed decision. Accordingly, it is now appreciated that there is a need to efficiently identify the quality of data prior to using the data in business processes. There is also a need to provide a holistic and centralized view of evidencing of the data quality within the organization, such as across various processes, groups, and so forth, to make informed business decisions.

With the foregoing in mind, FIG. 1 illustrates a block diagram of a data quality engine 10 (e.g., data management system). In general, the data quality engine 10 may include a comprehensive tool that identifies a quality of data, anomalies and abnormalities within the data, as well as provides options to correct the data. In some embodiments, correcting the data may include a data quality agent that is assigned a task to correct issues related with the unexpected quality data. The data quality engine 10 may also be self-learning, such that the data quality engine 10 may utilize machine learning to quickly identify data quality, identify anomalies, provide actions to remedy low quality data, and so forth.

As shown, the data quality engine 10 may include target state component(s) 12, a centralized data quality model 14, and an information technology (IT) evidence store 16. Generally, the data quality engine 10 may receive data, evaluate data, report data, as well as correct data. As will be discussed in detail with respect to FIG. 8, data quality information for the target state components 12 may flow to the centralized data quality model 14, which may include one or more models implemented to evaluate the data quality on the targeted components. The target state components may include data from specific sources (e.g., a file, a particular attribute in a file, database, a table of a database, streaming data sources, and so forth). The information indicating data quality for all data across the data system may flow to the information technology evidence store 16, which may store an indication of the data quality observed by the centralized data quality (DQ) model 14 (e.g., herein referenced as the "evidence data quality"). A centralized display (e.g., via a graphical user interface (GUI) may be provided that provides an indication of the evidence data quality. Although the systems and methods described herein may relate to a file critical data element in a bank information technology context, which represents a particular embodiment, the systems and methods described herein may apply to other contexts, such as other data from other sources and/or other organizations. For example, data from other sources may include tables, applications, pictures, data from streaming sources, and so forth. Other organizations may relate to real estate, education, engineering, and the like.

As shown, the target state component 12 may include a pipeline of elements. In particular, the pipeline of elements may include an analysis sensitive data and critical data element (CDE) identification (ID) block 20, a registration block 24, a pre-processing block 26, a file data quality block 28, an initial data quality layer (DL0) block 32, a managed foundation pipeline (MFP) block 34, a first and second data quality layer (DL1 and DL2) block 36, a data build tool (DBT) block 38, a third data quality layer (DL3) block 40, and a fourth data quality layer (DL4) block 44. The data quality engine 10 may use one or more circuitries, software, hardware, and the like to execute one or more processes, models, algorithms, and the like, at each of the blocks to perform the function associated with the respective block. Although the depicted embodiment shows a particular order of data flow between the blocks 20, 24, 26, 28, 32, 34, 36, 38, 40, and 44, the systems and methods described herein may include other orders of blocks and thus, other orders of the data quality (DQ) processing. In some embodiments, at least blocks 32, 34, 36, 38, 40, and 44 may operate in the order depicted.

At the analysis sensitive data and critical data element identification block 20, the data quality engine 10 may identify sensitive information, a critical data element, or the like. Generally, a critical data element may include data that is critical to the organization's success in a specific business area, used often for business operations, or both. Identifying critical data elements may allow organizations to prioritize tasks and business goals more accurately. Data may additionally or alternatively be identified as sensitive information. For example, the data may contain sensitive numbers, letters, and/or symbols indicative of sensitive information.

After identifying the data as sensitive information and/or a critical data element, the data quality engine 10 may register the data into a marketplace associated with and/or owned by the organization at the registration block 24. In particular, the data quality engine 10 may register metadata for the data. That is, the data quality engine 10 may register metadata that indicates information for evaluating the data quality, such as data format is sensitive information, a critical data element, or both. In some embodiments, the data quality engine 10 may also register non-critical data (e.g., not critical data element(s)). Moreover, in some embodiments, the metadata may tag the data as the critical data element, non-critical data element, sensitive information, and so forth. The metadata may indicate an expected data format. As will be discussed herein, as part of the data quality validation process, the metadata may be validated prior to using the data down the pipeline within the target state components 12, the centralized data quality model 14, and/or the IT evidence store 16. In this manner, errors that occur during metadata validation may be addressed promptly and efficiently prior to reliance upon the metadata downstream.

In particular, at the pre-processing block 26, the data quality engine 10 may run one or more procedures or processes to determine that the metadata has been registered and/or validate the metadata. Moreover, the data quality engine 10 may provide the registration metadata and/or the validation of the metadata to an asset metadata issues part, as will be discussed herein. In some embodiments, validation of the metadata registration may be performed by the registration block 24, the pre-processing block 26, the file data quality block 28, or any combination thereof.

In some embodiments, the file data quality block 28 may validate the data quality of the data elements using one or more business rules, technical rules, or both, and based on the information (e.g., parameters set by the registration) associated with the metadata registration. That is, the file data quality block 28 checks contents of the file (e.g., data element). Business rules may include business requirements for specific data (e.g., conditions for making a decision). The technical rules may include technical requirements associated with the business rules, such as when is data arriving, which data is loaded and where, thresholds associated with the business rules for determining pass or fail determinations (e.g., low quality data or high quality data), and so forth. For example, the metadata data may provide information indicative of a schema validation to validate an expected data format, review and validate empty files (e.g., file is expected to be empty), control and compare a count of expected and received data from a source, review duplicate runs of data and confirm duplication as expected or an error, set file thresholds (e.g., receive a particular number of files from a particular source at a particular time of date), determine that data is within the threshold, and so forth. That is, the data quality engine 10 may generally check that the data is within an expected threshold for subsequent usage within the pipeline. The data quality engine 10 at the file data quality block 28 may perform these checks based on the information associated with the registered metadata. For example, the data quality engine 10 at the file data quality block 28 may confirm that the format of the data complies with an expected format and that the data is registered as expected using the metadata.

The file data quality block 28 may detect quality errors, for example, based on the threshold associated with the rules. Upon detecting a quality error, the data quality engine 10 may prevent the data from flowing down the pipeline, which may otherwise result in errors for processes executed down the pipeline. In some embodiments, the file data quality block 28 may re-run data quality validation if the file data quality block 28 detects a low-quality data (e.g., quality fails since it's below a predetermined quality threshold). The file data quality block 28 may also determine errors based on a record value outside a threshold of a periodic average for the records. The data quality engine 10 may detect, report, and/or resolve (e.g., remedy) for the error, and re-run the data quality check. As will be discussed herein, an anomaly detection algorithm may be used to determine the periodic average and present record falling outside of the average.

If the file data quality fails, such as the format of the file is incorrect or the data quality engine 10 receives an empty file when the expected file is not to be empty, the failure may be reported to a data quality data mart, as will be discussed herein. As will be discussed herein, the data quality engine 10 may automatically or manually correct or remedy the failure, provide the data to an agent to correct or remedy the failure, or both. In some embodiments, the data quality engine 10 may automatically generate a report and a task assignment to resolve any data quality failures, which may also be identified in the report.

By way of example, the schema for an incoming file data may be expected to have a file data format including a table having a first column with a username, a second column with an address, a third column with a city, and a fourth column with a zip code. At the file data quality block 28, the data quality engine 10 may validate the schema by confirming that the file received is in this format, with the columns and respective information (e.g., name, address, city, zip code). In particular, the data quality engine 10 may review the incoming file data for a specific format at the respective column, such as a nine-digit number consisting of five digits, a hyphen, and four digits, at the zip code column. Similarly, the data quality engine 10 may confirm that a received source file expected to include sensitive information indeed includes sensitive information, for example, based on specific letters, numbers, symbols, sequences, and so forth, at one or more fields of the data. The data quality engine 10 may perform file validation for each piece of incoming data from any source, at periodic intervals (e.g., hourly, daily, and so forth), evaluate the data as it is received, evaluate the data simultaneously, provide the results simultaneously, and so forth. As such, the data quality engine 10 may be proactive and validate based on the data type and expected file format. In some embodiments, the data quality engine 10 may validate the data at the file data quality block 28 at any entry point (e.g., at any point in the pipeline, from any source, or both). By registering the metadata, validating the metadata, and checking the data quality, the systems and methods described herein may facilitate efficiently validating data quality before generating a report at the end of a pipeline prior to using the data in a business processes that may otherwise result in unexpected consequences from low quality data (e.g., expenses for remedying the process using the low quality data).

After validating the data and/or remedying a failed quality data, the data quality engine may send a file to the data pipeline layers such as the DL0 block 32, and other data movement tools may send data to the DL1 and DL2 block 36, and/or the DL4 block 44 within the pipeline. After validating the data that has been remediated (e.g., within quality threshold), the data quality engine 10 may send the data to the DL0 block 32. Generally, the data quality layers may include processes performed by the data quality engine 10, another agent, an application, or any combination thereof. For example, the data quality engine 10 may check the data against rules associated with the data quality layers, for example, the rules associated with the DL4 block 44. Additionally, the rules discussed herein may be associated with thresholds for determining low quality or high quality data. The data quality engine 10 may apply rules associated with each of the data quality layers, which may be associated with respective dimensions. As such, at respective layers, the data quality engine 10 may review the incoming data for one or more dimensions including validity, completeness, uniqueness, accuracy, consistency, and timeliness. In some embodiments, and as will be discussed herein, the rules may include default rules from a catalog, which may be authored and modified based on the organization. That is, the rules may be modified or revised based on needs of the organization. New custom rules may also be implemented. The DL0 block 32 may provide the data to the MFP block 34. The MFP block 34 may in a management system or web service to process and move data between compute and storage devices, such as the warehouses and data quality layers.

Generally, validity is a data quality dimension that confirms that the data conforms to a specific format or follows business rules. For example, data indicative of a zip code entry may be valid if the entry includes the correct characters for a particular region, as defined by the business rule. In a calendar, data indicative of a month entry may be valid if the entry matches the standard global month names. Any invalid data may affect the completeness of data. As such, the rules may be defined to either ignore or to resolve the invalid data for ensuring completeness.

The completeness dimension may confirm that the data fulfills expected level of comprehensiveness. By way of example, if the data requires that an entry with a first and last name, and the entry includes an optional middle name, the data may fulfill the completeness dimension as long as the first and last name are in the entry. That is, the data is complete.

The unique dimension may confirm that the there is only one instance of information in the database, ensuring that none of the information is duplicated. The accuracy dimension may evaluate the degree to which information accurately reflects an event or object described. For example, if date for a bank customer's birthdate indicates that the customer is thirty-two and the system indicates that the customer is thirty-four, the information is inaccurate. Often, same information may be stored in more than one storage (e.g., warehouse, database, and the like).

The consistency dimension confirms that this information matches across the different storages, that the information is consistent. For example, if the bank stores data indicating that that an employee has been terminated but the accounts department of the bank stores data indicating that the terminated employee is still employed and receiving payment, then the employment information across the storage places may be inconsistent. The timeliness dimension may evaluate data to be present at an expected time, such that the data is timely. For example, the rules for the timelessness dimension may confirm that data that is expected for review on the last Friday of each month is available on the last Friday of each month.

In some embodiments, such as the depicted embodiment, the data quality engine 10 may enter a first data entry point (e.g., server) at the DL0 block 32, tokenize the data at the DL1, and transition to cloud services (e.g., snowflake) at DL2 block 36, where the data is loaded (e.g., into a cloud storage). The DL3 block 40 and/or the DL4 block 44 may be general purpose marts (e.g., rather assigned for specific tasks or subject area). Generally, the general purpose parts may include data warehouses, as well as consumption layers where data analytic tools may perform analysis on received data. In some embodiments, one or more systems of the data quality engine 10 may perform the quality checks, loading, etc. at the data quality layers. By way of example, the system may be a software as a service (SaaS) that provides a single platform for data warehousing, data lakes, data engineering, data science, data application development, secure sharing and consumption of real-time and shared data, and so forth. The SaaS may be a cloud platform, such that the warehouses are provided on the cloud infrastructure. In the depicted embodiment, the bank may implement SaaS. The data quality layers (e.g. DL3 40 and DL4 44) may be associated with different warehouses. Moreover, the DL3 block 40, the DL4 block 44, or both, may implement data quality rules (e.g., performed by an analyst or agent performing the analysis, automatically by the data quality engine 10, or both), business rules (e.g., product codes in banking), and the like. By way of example, a business rule may include data indicating five credit card are currently offered by the bank. However, if the data loaded into the data quality layers indicates a sixth credit card option offered by the bank, then the data quality rules, the business rules, or both, may indicate an issue with the data quality (e.g., below a quality threshold) that may need resolving.

Generally, to transform/move the data between the different data quality layers, the data quality engine 10 may use the DBT 38 to transform/move the data between one or more layers of the data quality layers. The DBT 38 may provide this information to an operational run statistics data mart. The data quality engine 10 may provide a comprehensive data quality evaluation by evaluating the metadata, subsequently evaluating data quality, as well as determining dimension validity for the data. The data may be received from different sources and integrated into the pipeline. The data quality may be evaluated based on different data quality dimensions and the rules implemented for these dimensions may be authored (e.g., written, revised, etc.) by the organization, as previously mentioned. If the data quality fails, for example, the quality is below a threshold quality, the failure may be reported to the centralized data quality model 14, as indicated by the dashed line arrows. In some embodiments, the results may be reported to the centralized data quality model 14 (e.g., passing or failing data quality). Although the dashed line arrows are shown as unidirectional, which represents a particular embodiment, the data may be distributed and communicated in multiple directions (e.g., bidirectional) between the target state components 12, the centralized data quality model 14, and/or the information technology evidence store 16.

As shown, the centralized data quality model 14 may include an asset metadata issues mart 50, a data quality data mart 56, a data quality engine (DQE) timeliness dimension 64, an operational run statistics data mart 68, and a data build tool (DBT) and extract, load, transform (ELT) asset controls block 76 (DBT ELT). As previously mentioned, the data quality engine 10 may use one or more circuitries, software, hardware, and the like to execute one or more processes, models, algorithms, and the like, at each of the blocks or sub-blocks (e.g., block within or associated with another block) to perform the function associated with the respective block. Although the discussions described herein generally describe marts (e.g., the asset metadata issues mart 50, the data quality data mart 56, the operational statistics data mart 68) receiving information for data issues, which represents a particular embodiment, the marts may also receive the information for nonissues. For example, the marts may receive the information for record keeping, analysis of data trends, and so forth.

As previously discussed, the data quality engine may report evaluations from the registration metadata validation and data quality dimension to the centralized data quality model 14, as indicated by the dashed line arrows. In particular, registration block 24 may send the validation results of the metadata to the asset metadata issues mart 50. In some embodiments, the registration block 24 may only send issues with the metadata. For example, if the data is improperly registered, then the registration block 24 may send an indication of the failure issue to the asset metadata issues mart 50. Similarly, the file data quality block 28 may send data quality results to the data quality data mart 56. For example, if the data quality is below a quality threshold (e.g., format is incorrect below a format quality threshold), then the file data quality block 28 may send the failure results to the data quality data mart 56.

The asset metadata issues mart 50 includes an asset block 52 and an asset property block 54 (e.g., sub-blocks of the asset metadata issues mart 50). The asset block 52 may identify the asset (e.g., product, resources, and the like) associated with the failed metadata. The asset property block 54 may identify data property associated with the asset, the metadata, or both. The asset block 52, the asset property block 54, or both, may evaluate the issues of the metadata received at the asset metadata issues mart 50 to provide one or more resolutions to bring the metadata registration back to a valid state (e.g., correctly registered within a threshold). Specifically, the asset metadata issues mart 50 may provide the evaluation of the asset and the property based on the failed metadata registration to a centralized information technology controls asset, as will be discussed herein.

The data quality data mart 56 may receive quality information, such as from the data quality dimension blocks and/or the file data quality block 28, to evaluate the data quality issues. As shown, the data quality data mart 56 may include an asset code error block 58, an asset code error summary block 60, and a profiling results block 62. After receiving the data quality issues at the data quality data mart 56, the asset code error block may identify a code associated with each of the issues. The code may identify the specific asset associated with the error, particular failures causing the issue, and/or one or more resolutions that may be implemented to resolve the failure. In particular, at the asset code error summary block 60, the data quality engine 10 may provide a summary of one or more failures associated with the code. The summary may provide a more detailed evaluation than the asset code error block 58, which may generally provide an error code and a brief outline of the failure. Moreover, at the profiling results block 62, the data quality engine 10 may involve examine, analyze, and create the summary of each of the issues associated with each of the assets. Generally, the profiling provides a high-level overview to assist in the discovery of data quality issues, risks, and overall trends. The data profiling may also provide insight into data quality rules and requirements that may support a more thorough data quality assessment after the issues are analyzed.

In some embodiments, and as shown, the data quality data mart 56 may receive information from a data quality timeliness dimension. In additional or alternative embodiments, the timeliness dimension may be one of the data quality dimensions previously discussed (e.g., DL1 and DL2 block 36, DL3 block 40 and/or DL4 block 44). Although the following discussions describe the timeliness dimension, which represents a particular embodiment, the data quality engine timeliness dimension 64 may additionally or alternatively apply to the other dimensions previously discussed (e.g., validity, completeness, uniqueness, accurate, and/or consistency). The data quality engine timeliness dimension 64 may receive the information from the operational run statistics data mart 68, as will be discussed herein.

The data quality engine timeliness dimension 64 may include an asset service level objective (SLO) block 65 and an asset service level agreement (SLA) block 66. Generally, the asset SLO block 65 may identify a key element of a service-level agreement between a service provider (e.g., the bank) and a customer (e.g., bank customer). The SLO may be an agreed upon means of measuring performance, such an uptime or response time (e.g., timeliness). For example, the SLO may include a time for having data process (e.g., 9 AM CST). Thus, the asset SLA block 66 may involve the threshold for the agreed upon SLO. For example, the agreement of the SLA block 66 may be that 90% of the performance under the SLO is to be met. If the data indicates that only 80% timeliness is met, then the data quality engine 10 may identify an error at the data quality engine timeliness dimension 64.

Moreover, the DBT 38 discussed with respect to FIG. 1 may provide information to the operational run statistics data mart 68 of the centralized data quality model 14 includes, such as information pertaining to data quality issues or data moving within the data quality layers. The data quality engine 10 may also receive data from other blocks at the operational run statistics data mart 68, as indicated by the dashed line arrows. For example, the operational run statistics data mart 68 may receive data from the MFP block 34, the file data quality block 28, and/or the pre-processing block 26. The operational run statistics data mart 68 may evaluate operational statistics related to the received data information. The operational run statistics data mart 68 may generally receive statistical data information when data is processed, stored, or both. Moreover, the operational run statistics data mart 68 may provide the evaluated statistics as an input to the data quality engine timeliness dimension 64, which may operate as previously discussed. For example, the operational run statistics data mart 68 may determine how many records were received in a particular file compared to how many were expected, perform a timeliness analysis on when the records were received, preform a consistency check of the records, and so forth. By way of example, for a consistency check, the data quality engine 10 may check if 100 records were received at the DL3 block 40 if 100 records were received or stored at the DL1 and DL2 block 36 (e.g., consistently 100 records). By way of another example, the data quality engine 10 may determine if information at the operational run statistics data mart 68 indicates that the 100 records were loaded at the DL3 block 40 at an expected time of 6 am. Thus, information pertaining to each of these and similar data statistic events are sent to the operational run statistics data mart 68, and the statistical data may be used as input at the data quality engine timeliness dimension 64.

The operational run statistics data mart 68 may include an asset job status block 70, a job parameters block 72, and an asset counts block 74 (e.g., sub-blocks of the operational run statistics data mart 68). Data associated with a job (e.g., a process, execution, and the like) may be communicated between each of the blocks 70, 72, 74. In general, the asset job status block 70 may indicate the asset associated with the received information, as well if the general job status of the process associated with the received information is a success or a failure. The job parameters block 72 may indicate the parameters for the process, such as job name, associated controls, name for orchestration, and so forth. The asset counts block 74 may indicate a count for the job, such as 100 records received of 100 expected.

As shown, the DBT 38 discussed with respect to FIG. 1 may also provide information to the DBT ELT asset controls block 76 of the centralized data quality model 14, such as information pertaining to data quality issues or data moving within the data quality layers. Generally, at the DBT ELT asset controls block 76, the data quality engine 10 may resolve any data quality issues prior to loading the data at a centralized data warehouse. The data quality engine 10 may tests data quality, integration, and code performance at the DBT ELT asset controls block 76. In particular, the DBT ELT may be a tool that that enables data analysts and engineers to transform data in their warehouses by writing select statements (e.g., command line code). The DBT ELT may use received code, compile it to structured query language (SQL), and then run it against a database or warehouse. As will be discussed herein, the DBT ELT asset controls block 76 may provide the transformed data to a centralized information technology control assets data mart.

As shown, the data quality engine 10 includes the IT evidence store 16 in a bank IT context. Generally, evidencing may refer to recording results of data evaluations within the system. Often, evidencing may be performed manually for each critical data element or asset. However, using the data quality engine 10 described herein, the data quality engine 10 may simultaneously and proactively evaluate and record the evaluated data. Moreover, the evidencing may be performed every minute, every hour, daily, and so forth, rather than at longer intervals, such as monthly. The IT evidence store 16 includes a centralized information technology (IT) controls asset data mart 80. As shown, the centralized information technology controls asset data mart 80 is a centralized management center for all of the data from the data marts of the centralized data quality model 14. In particular, the centralized information technology controls asset data mart 80 receives marketplace registration metadata validate data 82 from the asset metadata issues mart 50, data quality dimensions and controls 84 from the data quality data mart 56, operational metadata controls 86 from the operational run statistics data mart 68, and ELT data movement controls 88 from the DBT ELT asset controls 76. As such, the centralized information technology controls asset data mart 80 provides all the data in a single space, such as a portal or page of a user interface. Rather than segmented data, data evaluations, data storage, and so forth at respective pipeline blocks or data marts, the centralized information technology controls asset data mart 80 provides a centralized location for controlling the parameters for the blocks of the data quality engine 10.

Moreover, rather than individually evaluating data quality from the various data types from different sources, such as business data or technical data from different sources, the centralized information technology controls asset data mart 80 facilitates evaluation of each data type (e.g., business, technical, or both) in a centralized location by executing respective data type rules in a centralized location (e.g., business data rules and technical data rules). That is, the different data types may be evaluated using the different dimensions as the data flows to the centralized information technology controls asset data mart 80. As such, the centralized information technology controls asset data mart 80 removes analysis otherwise performed manually and/or individually for each of the data types for each dimension.

Moreover, as previously briefly mentioned, the data rules may be authored. Often, business process engines utilize hardcoded rules for the data. The data quality engine 10 described herein facilitates rule authoring, such that the organization (e.g., bank) may generate, modify, rewrite, and so forth, the rules for evaluating the data from the various sources.

As will be discussed herein, the data quality engine 10 may implement an anomaly detection algorithm and the detection control and results may be integrated with a dashboard for the data quality engine 10. As such, the centralized information technology controls asset data mart 80 may provide an end-to-end data quality analysis in a single, central location for data across an entire data system. The centralized information technology controls asset data mart 80 may also provide proactive monitoring across the data quality dimensions. That is, the data may be analyzed as it is received at the centralized information technology controls asset data mart 80 in real time rather than period offloading of data. As such, the critical data elements may also be monitored and evidenced in a central location by the centralized information technology controls asset data mart 80. The centralized information technology controls asset data mart 80 may include a dashboard displaying the centralized information so that the quality results, analysis, trends, recommendations, controls, are displayed in a centralized location. The rules implemented on the various data elements may be authored based on the analysis or trends determined at the centralized information technology controls asset data mart 80.

Figure 3:
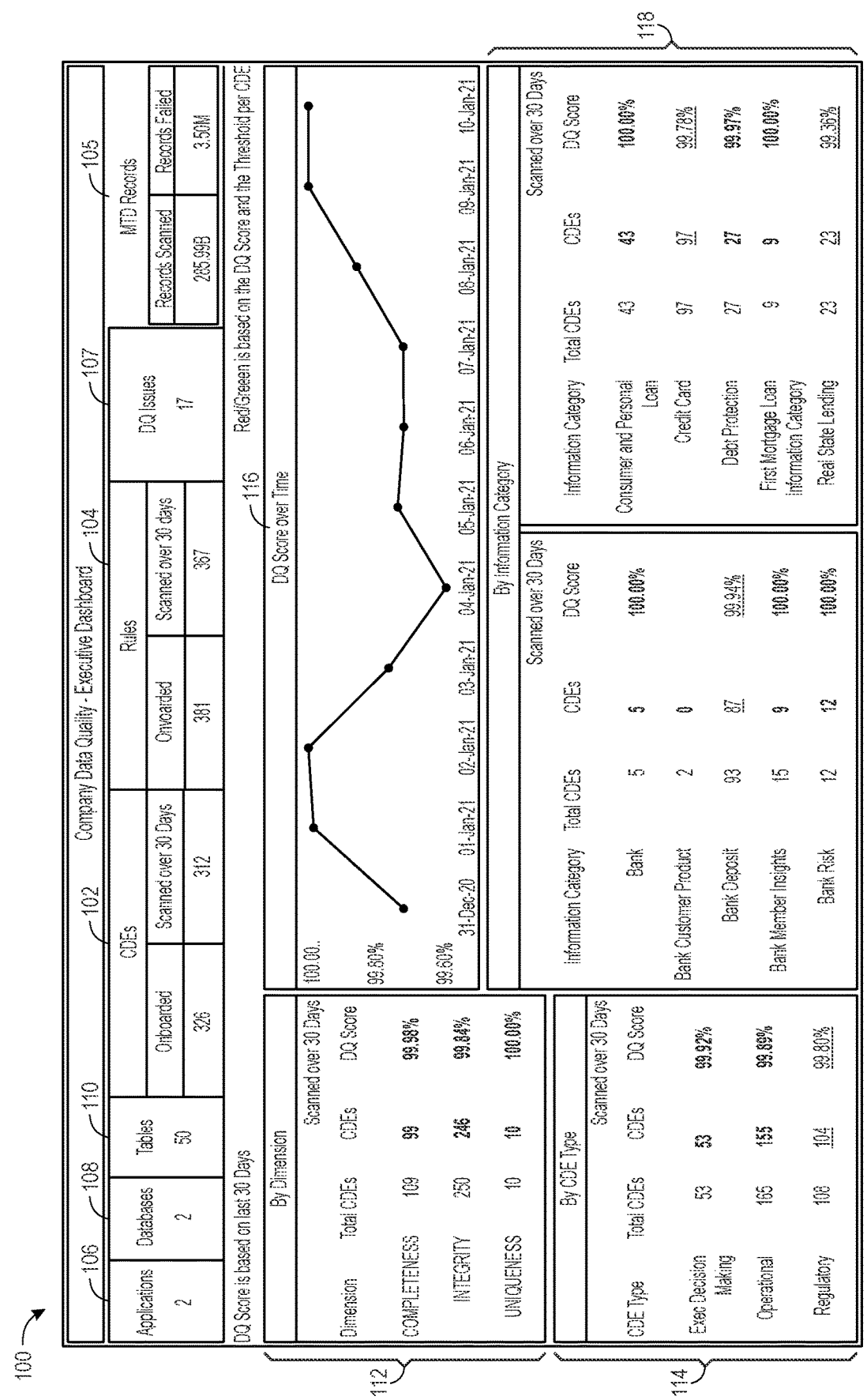
FIG. 3 illustrates a block diagram of a dashboard associated with the data quality engine to display centralized information, in accordance with embodiments described herein.

To illustrate, FIG. 3 is block diagram of a dashboard 100 associated with the data quality engine 10 to display the centralized information technology controls asset data mart 80. Here, the dashboard 100 is in a banking context, as previously discussed. As shown, the dashboard 100 provides an overview of the critical data elements 102 on-boarded (e.g., 326 as shown) into the data quality framework executed by the data quality engine 10 over a time frame (e.g., 312 days as shown). The dashboard 100 may also display the rules 104 that are on-boarded (e.g., 381 as shown) to evaluate the critical data elements 102. The rules 104 may be scanned periodically (e.g., 367 as shown). The dashboard 100 may display the number of data quality issues 107 (e.g., 17 as shown), as well as a month-to-date records 105 of the number of records scanned (e.g., 285.99 billion as shown) and the number of records that failed (e.g., 3.50 million as shown). Additionally, the dashboard 100 may also display the number of various applications 106 (e.g., 2 as shown), databases 108 storing the data (e.g., 2 shown), and tables 110 (e.g., 50 as shown) that are analyzed, which may include the critical data elements 102. In general, the dashboard 100 may provide a high level summary to business groups and executives within the organization for an overview of critical data elements assessed and the critical data elements that may need have issues to be resolved.

The dashboard 100 may show a dimension score 112. As shown, the dimension score 112 displays the dimension type, a total number of critical data elements 102 analyzed (e.g., 109 for completeness) under a particular dimension (e.g., complements, integrity, uniqueness, and so forth), the number of passing critical data elements 102 (e.g., 99 for completeness), and a data quality score based on the total critical data elements and passing critical data elements (e.g., 99.98% for completeness). The dashboard 100 may display such evaluation and scoring for each of the dimensions evaluated or discussed herein.

Additionally, the dashboard 100 may also display a critical data element type score 114, which may display the data quality score for each of a critical data element type in the data system. In the depicted embodiment, the critical data elements include an executive decision-making type, an operation type, and regulatory type. In particular, the critical data element type score 114 display a total of critical data elements for the type (e.g., 53 for the executive decision making critical data elements), the number of passing critical data elements for the type (e.g., 53 for the executive decision making critical data elements), and a data quality score for the type based on the total number of critical data elements for the type and the passing critical data elements for the type (e.g., 99.92% for the executive decision making critical data elements). In some instances, the dashboard 100 and/or the critical data element type score 114 may display a high-level summary of the data quality scoring. As such, other information within the system that may be considered for data quality that may not be displayed. In some instances, the other information may increase or decrease the data quality score on the critical data element type score 114, such that the score is not reflective of only the total number of critical data elements for the type and the passing critical data elements for the type. Moreover, the dashboard 100 may provide an indication (e.g., font style, symbol, etc.) to distinguish between subsets of information. For example, the dashboard 100 may change the font color, style, and so forth for the different subsets of information. To illustrate in the depicted embodiment, the data quality scores that are passing above a predetermined quality threshold are in a bold font while failing data quality scores are underlined.

Furthermore, the dashboard 100 may also show an information category score 118. In the depicted embodiment, the information category includes consumer and personal loan, credit card, debt protection, first mortgage loan information, real estate lending, bank, bank customer product, bank deposit, bank member insights, and bank risk. In particular, the information category score 118 may display a total of a critical data elements for the category (e.g., 43 for the consumer and personal loan), the number of passing critical data elements for the category (e.g., 43 for the consumer and personal loan), and a data quality score for the category based on the total number of critical data elements for the category and the passing critical data elements for the category (e.g., 100% for the critical data elements for consumer and personal loan).

Moreover, the dashboard 100 may provide a data quality score over time 116 that display a trend of the overall data quality in the system (e.g., all the critical data elements). As such, the dashboard 100 may display a holistic view of the quality of data within the system that may be used for business decisions. For example, in the depicted embodiment, the data quality generally increased or remained the same between Jan. 5, 2021 and Jan. 10, 2021. Since the dashboard 100 provides a high level overview of the data elements that are failing and passing (e.g., by type, dimension, category, and so forth), and the data quality engine 10 may keep a record of all the critical data elements, the rules applied and authored, data quality thresholds set, and so forth, the organization may efficiently decide which data elements may need to be reviewed and resolved, rules that may need to be revised, processes that facilitated the increase in data quality score over time based on the records, and so forth. Additionally, the information on the dashboard 100 may be provided in a single report for efficient review (e.g., via a single-click button on the GUI). In this manner, the dashboard 100 and report may provide a quick, relevant, and concise summary of the current state of data quality in the system to the organization in a single location.

Figure 4:
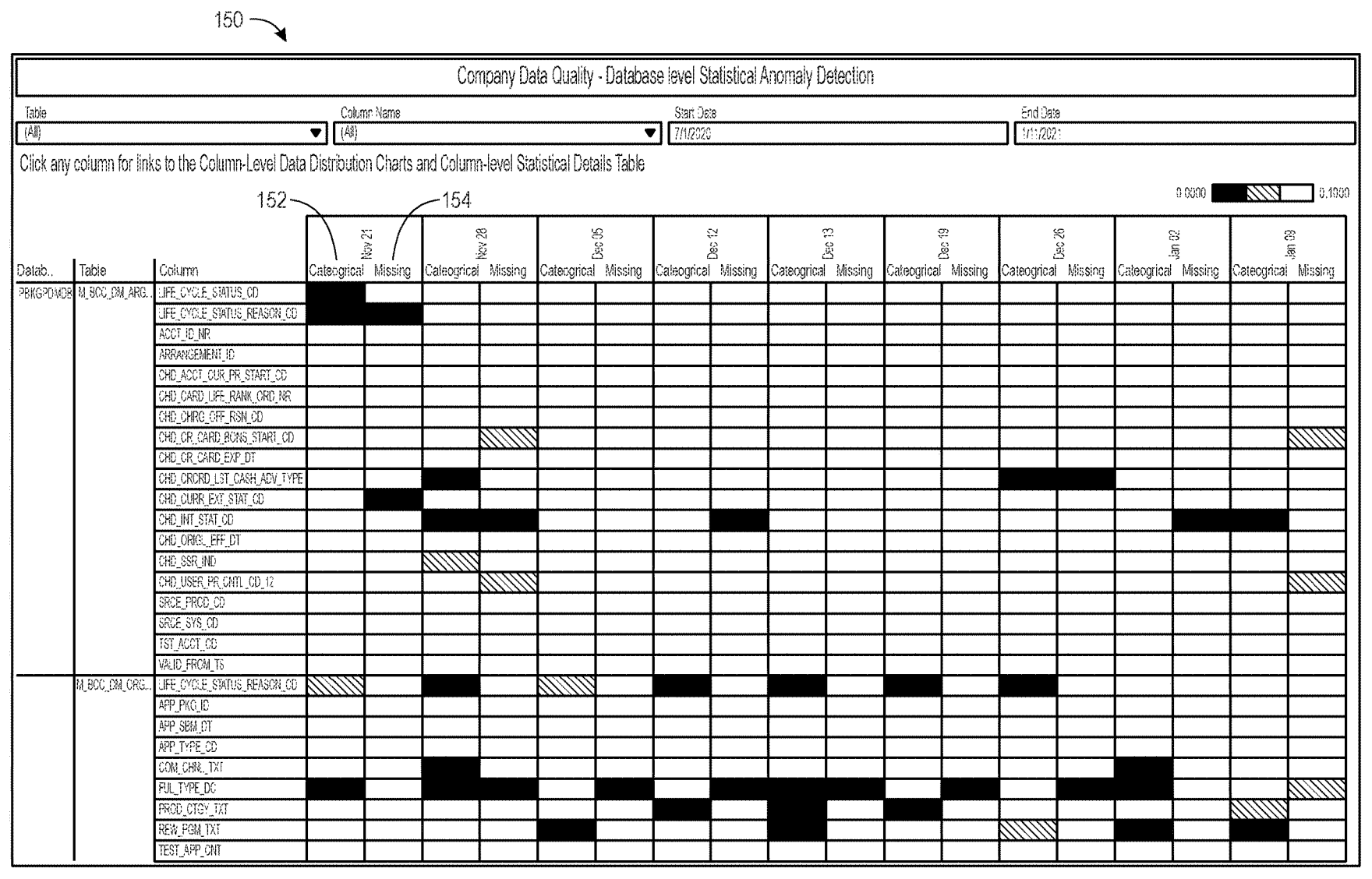

FIG. 4 illustrates a block diagram of an anomaly detection dataset dashboard 150 associated with the data quality engine 10 to display anomaly detection. In some embodiments, the information displayed on the dashboard 150 may be displayed on the dashboard 100, integrated with dashboard 100, or both. That is, the information displayed on a particular dashboard described herein may additionally or alternatively be displayed on the centralized dashboard 100. As shown, the anomaly detection dataset dashboard 150 may provide a view of the quality of the data and anomalies associated with detected quality issues. The depicted anomaly detection dataset dashboard 150 indicates a specific table of critical data elements that are analyzed. In some embodiments, this dataset may be automatically selected based on a failure indication of the table in the dashboard 100. In the depicted embodiment, the dataset highlights statistical anomalies in the data such as new categorical values 152, missing data 154, but may also include additional anomalies if detected. In some embodiments, such as the depicted embodiment, the level of anomaly severity (e.g., how much it impacts the data quality) may be indicated. For example, the color, style of the cell pattern, letters, and so forth, may indicate the anomaly severity. Here, the solid fill for the anomaly indicates a high severity (e.g., large deviation from expected value or range of values) while a diagonal line pattern indicates low severity anomaly (e.g., small deviation from expected value or range of values).

Figure 5:
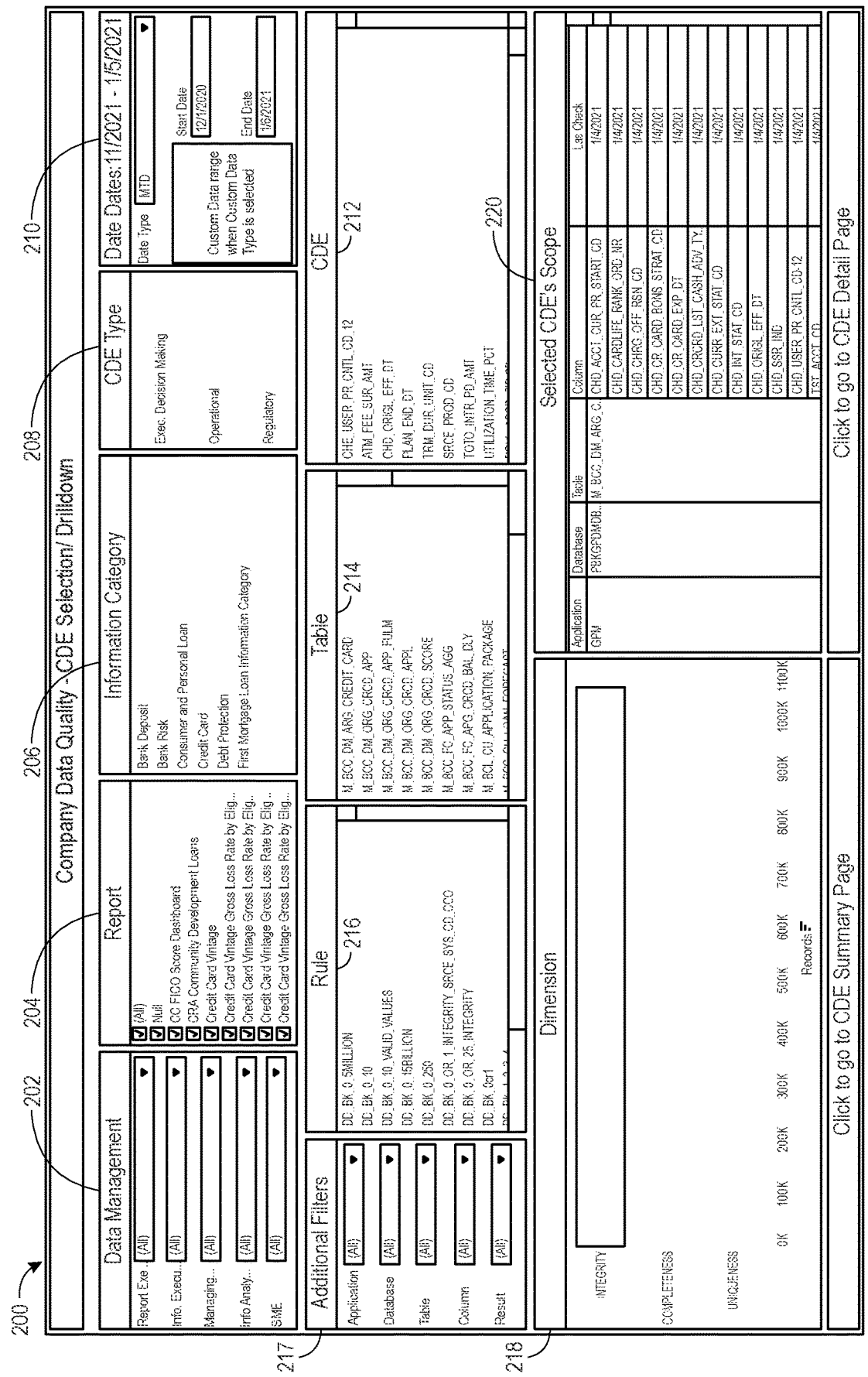
FIG. 5 illustrates a block diagram of a selection and drilldown dashboard associated with the data quality engine, in accordance with embodiments described herein.

FIG. 5 illustrates a block diagram of a selection and drilldown dashboard 200 associated with the data quality engine 10. In some embodiments, the information displayed on the dashboard 200 may be displayed on the dashboard 100, integrated with dashboard 100, or both. The selection and drilldown dashboard 200 may provide a way for users to select (e.g., drill down into) a precise set of data to analyze. Various metadata, such as information category 206, critical data type 208, data dates 210, data management contacts 202, database tables 214, and the like are combined with the regulatory reports 204, business rules 216 and data quality dimensions 218 to provide an efficient means to narrow down and find selective data. In some embodiments, such as the depicted, the selection and drilldown dashboard 200 may include additional filters 217 to provide an even more precise dataset for analysis. The selection and drilldown dashboard 200 may also display critical data elements 212 associated with the selected reports, selected information category, and so forth. The selection and drilldown dashboard 200 may also display the selected critical data elements in scope 220, which indicates one or more applications or assets associated with the selected critical data elements for the smaller dataset, as well as databases, tables, columns of the databases, and a last evaluation date of the data.

Figure 6:
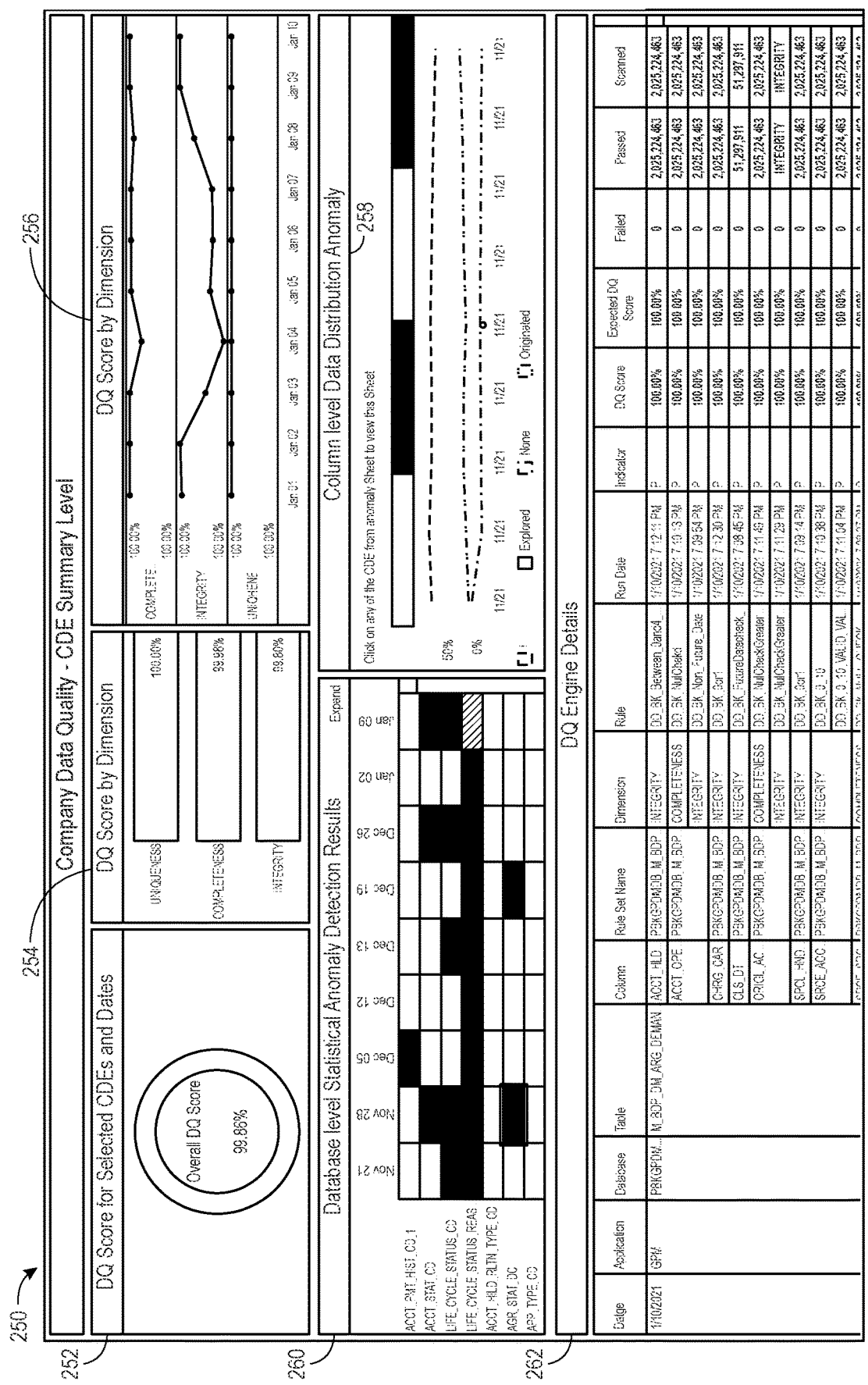
FIG. 6 illustrates a block diagram of a critical data element summary level dashboard associated with the data quality engine, in accordance with embodiments described herein.

FIG. 6 illustrates a block diagram of a critical data element summary level dashboard 250 associated with the data quality engine 10. In some embodiments, the information displayed on the dashboard 250 may be displayed on the dashboard 100, integrated with dashboard 100, or both. Generally, the critical data element summary level dashboard 250 may provide an overview of the data quality score by data quality dimensions and over time. In particular, upon a selection of selected data on the dashboard 200, the critical data element summary level dashboard 250 may provide the selected view of the critical data elements. As shown, the critical data element summary level dashboard 250 may display a data quality score for the selected critical data elements for the specific dates 252 (e.g. 99.86% overall score as shown), a data quality score by dimension 254 (e.g., 100% for uniqueness, 99.98% for completeness, 99.80% for integrity, and so forth), and a data quality score by dimension over time 256 (e.g., the data quality score by dimension 254 per date in January). The critical data element summary level dashboard 250 may also display a database level statistical anomaly detection results 260 for selected critical data elements, along with the severity level indications. In some embodiments, the critical data element summary level dashboard 250 may display a column level data distribution anomaly 258. The critical data element summary level dashboard 250 may combine the anomaly detection dataset to efficiently indicate recent changes or statistical anomalies in the data that the business rules may not otherwise be authored to detect. Additionally, at a data quality engine details 262, the critical data element summary level dashboard 250 provides an overview of the business rules that the data quality engine 10 may execute each day with information on the number of records scanned, passed and failed for each critical data element and rule.

FIG. 7 illustrates a block diagram of a failed critical data element rules and results dashboard 300 associated with the data quality engine 10. In some embodiments, the information displayed on the dashboard 300 may be displayed on the dashboard 100, integrated with dashboard 100, or both. As shown, the failed critical data elements may include a data 302 of the failure, an associated database 304, an associated table 306, an associated column 308, an information category 310 for the critical data element, a failed value 312 (e.g., value below expected predetermined threshold), a key column 314, a key value 316, a dimension level 318 (e.g., integrity), an argument text 320, a rule set name 322 of one or more rules associated with the critical data element, a rule name 324 of the rule set, an associated rule description 326, and a type of query 328 that is generated for the report (e.g., SQL query). Additionally, the failed critical data element rules evidence results dashboard 300 may display detailed results of selected key columns 314, which include records breaching the business rules. The failed critical data element rules and results dashboard 300 may provide details on what the rule is checking and examples of values that breached the rule. A SQL query is generated to allow analysts to evaluate the full dataset of failures per critical data element and rule result.

Figure 8:
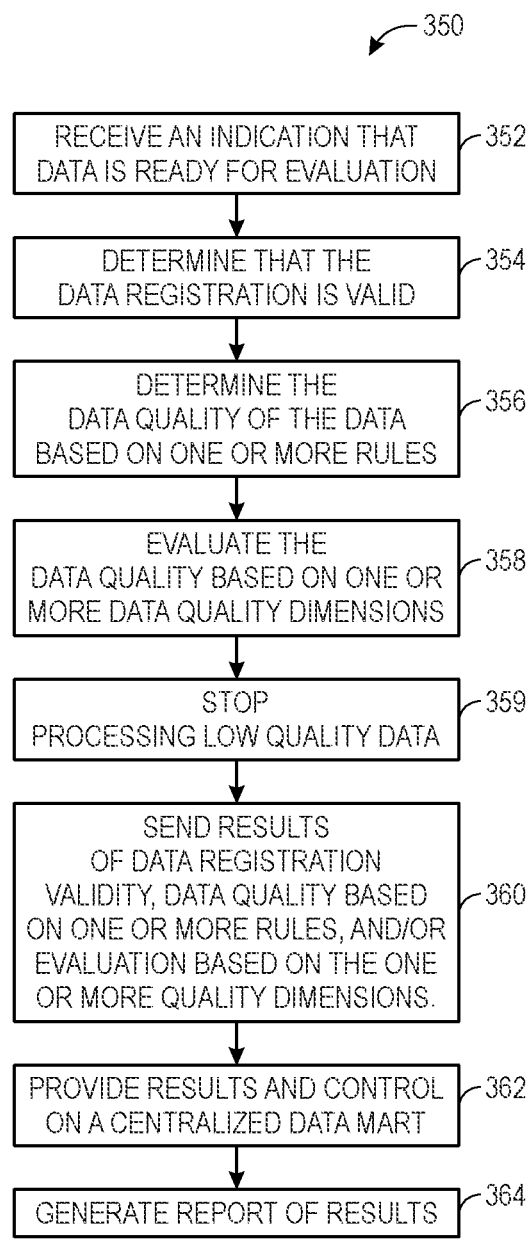
FIG. 8 illustrates a flow diagram of a method for evaluating data elements and providing the results and controls on a centralized system, in accordance with embodiments described herein.

FIG. 8 is a flow diagram of a method 350 for evaluating data elements and providing the results and controls on a centralized system. While the method 350 is described using acts in a specific sequence, it should be understood that the described acts may be performed in different sequences than the sequence illustrated, and certain described acts may be skipped or not performed altogether. In general, at least some of the steps of the method 350 may be implemented at least in part by a controller and/or the processor of the controller that executes instructions stored in a tangible, non-transitory, computer-readable medium, such as memory associated with the data quality engine 10. In alternative or additional embodiments, at least some steps of the method 350 may be implemented by any other suitable components or control logic, and the like.

The processor may receive (block 352) an indication that data is ready for evaluation. That is, the processor may receive an indication that the data is to be evaluated through one or more pipelines of processes of the data quality engine 10. As previously mentioned, the data quality engine 10 is proactive, such that the data quality engine 10 determines any unexpected data prior to using the data in the one or more pipelines to efficiently utilize system resources on data that passes an initial evaluation, reserving computing resources for good or passing data. In general, the data may include critical data elements (e.g., data used often for day-to-day operations, used in regular reporting, and so forth) associated with one or more assets of the organization. In some embodiments, the data may include non-critical data elements, and such distinctions may be indicated throughout processes executed by the data quality engine 10, a centralized data mart, or both. Moreover, the data may be received from multiple resources, such as from streaming (e.g., over a network), table of databases, files, application, and the like. As such, the evaluations described herein may be performed simultaneously or in parallel for the various critical data elements.

The processor may determine (block 354) that the data registration is valid. Specifically, the data may be associated with metadata, which may be determined as valid or invalid registration. Registration of the metadata may include data indicating the information for assessing the data quality. For example, if a file is received at the data quality engine 10, technical metadata may indicate the expected file name, schema, and so forth. Registration of the metadata may enable the data quality engine 10 to proactively determine low quality data, stop processing the low quality data, and/or resolve any issues with the data. For example, rather than using the data down a pipeline of processes (e.g., evaluation for each of the data quality dimensions) and inefficiently use system resources for data that will ultimately fail data quality based on improper registration.

Moreover, the processor may determine (block 356) the data quality of the data based on one or more rules. The rules may include business rules, technical rules, or both. Business rules may include business requirements for specific data (e.g., conditions for making a decision). The technical rules may include technical requirements associated with the business rules, such as when is data arriving, which data is loaded and where, thresholds associated with the business rules for determining pass or fail determinations, and so forth. Moreover, the data quality determination may be based on the information indicated by the properly registered data. Generally, default rules may be provided by a catalog for the organization. However, the rules may be authored, such that the rules are rewritable, removable, revisable, and so forth. That is, the rules are not hardcoded.

Determining the data quality prior to evaluation based on one or more data quality dimensions also provides a proactive approach determining quality of data and if the data is usable (e.g., passing above a predetermined quality threshold). Moreover, the anomaly detection algorithm discussed herein may apply to the results of determining registration validity, data quality, as well as the other results discussed herein. The anomaly detection also provides a proactive approach to evaluating data quality of the critical data elements. In particular, the data quality engine 10 may execute the anomaly detection algorithm to identify one or more anomalies in the data elements that exceed a predetermined variance threshold to provide early detection of data quality issues. Detection of an anomaly may trigger a data validation failure when the one or more anomalies are identified. As such, the data quality engine 10 may correct errors in addition to collecting data. The anomaly detection may provide an indication of any issues at every stage of data quality evaluation (e.g., registration, data quality, dimensions, and so forth). Moreover, the anomaly detection may utilize machine learning to learn to quickly and accurately identify anomalies within the data (e.g., with respect to other data or an average data threshold).

Additionally, the processor may evaluate (block 358) the data quality based on one or more data quality dimensions. As previously discussed, the dimensions may include validity, completeness, uniqueness, accurate, consistency, and/or timeliness. The evaluation for the dimensions may also be associated with one more rules, which may be authored, and that be associated with a predetermined quality threshold so that the data may be evaluated as passing (e.g., high quality data) or failing (e.g., low quality data). As previously mentioned, the anomaly detection (e.g., detect and correct anomalies within the data) may also be allowed to the evaluation.

In some embodiments, the processor may stop (block 359) processing low quality data. By way of example, if a file (e.g., critical data element) is received at the file data quality block 28) and it does not meet the quality threshold (e.g., fails rule), the data quality engine 10 may stop processing the data, such that the data is not used further down the pipeline in the system. In some embodiments, the data quality engine may provide a resolution to remedy the issue with the data so that data may still be processed. The processor may stop processing low quality at every stage of evaluation, for example, at registration validity, data quality, dimensions, and so forth. As such, the failing data quality may be detected, corrected, and otherwise prevented from going to the generated report at the centralized IT controls asset data mart 80.

Figure 2:
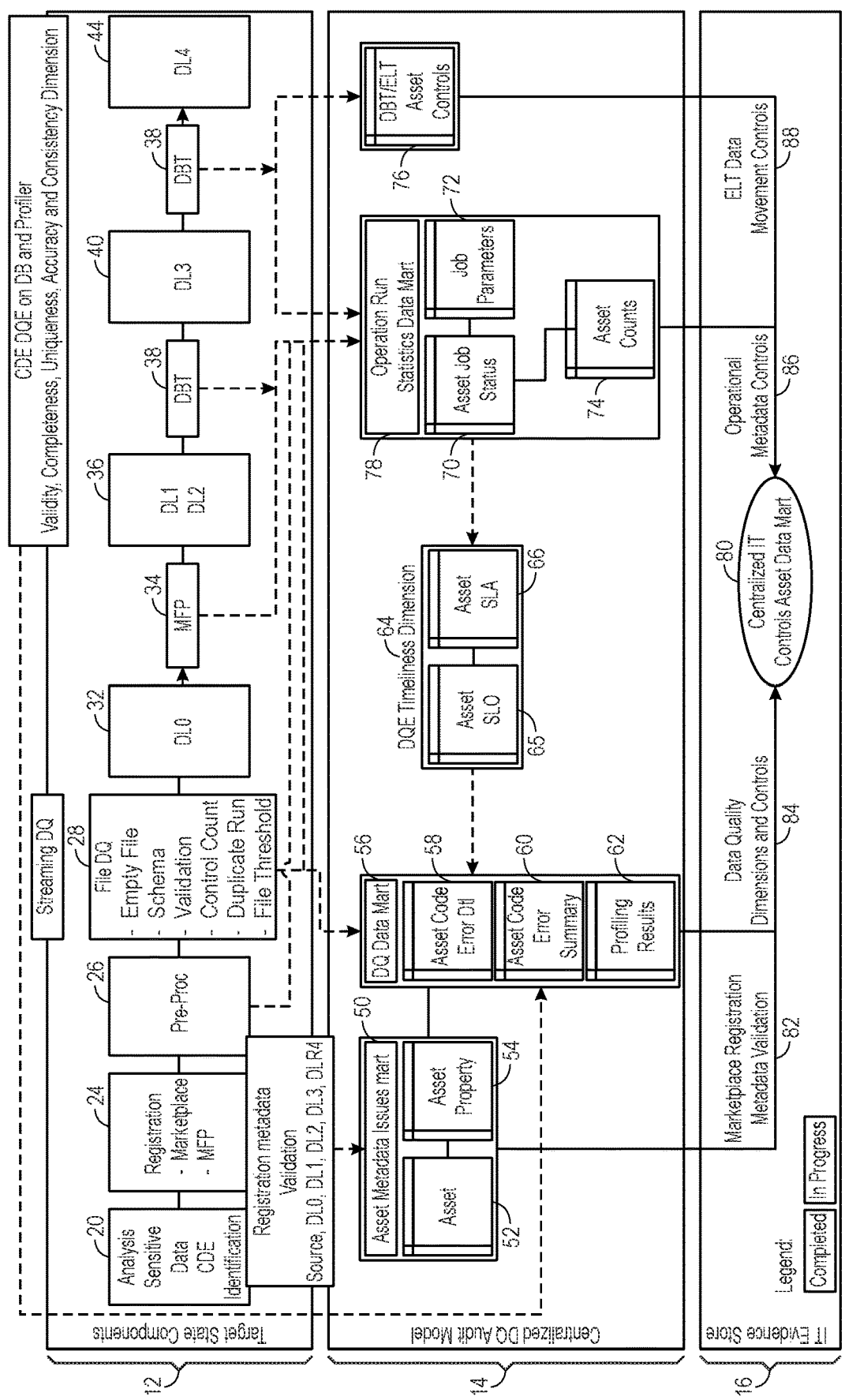
FIG. 2 illustrates a block diagram of the data quality engine in a bank information technology context, in accordance with embodiments described herein.

After the evaluation and/or stopping processing of low-quality data, the processor may send (block 360) results of the data registration validity, data quality evaluation, and the evaluation based on one or more dimension, for example, to respective data marts associated with the organization to compile data and analyze. As previously mentioned, the data elements may be evaluated periodically, such as daily or hourly rather than monthly for efficient detection and correction of low-quality data. Often, the results may include passing scores, failing scores, or both, for each of the results. The failing scores may be analyzed and addressed, as discussed with respect to FIG. 2.

Specifically, the processor may provide (block 362) results and controls on a centralized IT data mart. All the results may be displayed on a dashboard. That is, the results and analysis may be provided in a single location to provide a holistic view of data quality of the critical data elements across the system. The dashboard may provide a high-level summary of the data, trends, analysis, as well as a detailed analysis for a particular dataset upon a request to review. The dashboard may also provide correlation of data for a particular asset. For example, critical data elements for a particular category or type may often fail and thus, this correlation may be reviewed for correction by the organization.

Furthermore, the processor may generate (block 364) a report of the results. In particular, the dashboard may provide a centralized location to review results for all the critical data elements. The dashboard may also provide an option to generate a report with a single-click button on a GUI dashboard. The information provided at one or more dashboards may be included in the generated report. Since the results provide a holistic view of data quality across the system, the organization may efficiently review data quality trends and easily resolve issues with particular failing critical data elements. Moreover, and as previously mentioned, the option to correct failing data is provided at each step of data evaluation (e.g., of metadata registration, data quality, dimensions, etc.).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A data management system, comprising:
   a computing device comprising one or more processors configured to execute instructions stored in memory of the computing device, wherein the instructions, when executed by the computer device, are configured to cause the computing device to:

receive an indication that a plurality of data elements are ready for evaluation;

determine whether metadata registration for the plurality of data elements is valid;

in response to the metadata registration being valid, determine a data quality of the plurality of data elements, by providing the plurality of data elements to one or more data quality layers configured to evaluate a quality of values of the plurality of data elements based on a plurality of data quality dimensions comprising:

validity, by determining whether the values conform to a specific format provided to the one or more data quality layers, completeness, by determining whether the values conform to an expected level of comprehensiveness provided to the one or more data quality layers, uniqueness, by determining whether the values are duplicated among the plurality of data elements, accuracy, by comparing known information with the values for conflicts, consistency, by determining whether the values match across different storage devices, and timeliness, by determining whether the values are present at an expected time provided to the one or more data quality layers;

in response to the metadata registration being invalid:
cease processing of the plurality of data elements;
periodically re-determine whether the metadata registration is valid; and
determine the data quality of the plurality of data elements, when the metadata registration becomes valid; and provide an indication of the data quality of the plurality of data elements via a graphical user interface (GUI) generated via a centralized data mart.

2. The data management system of claim 1, wherein the instructions when executed by the one or more processors, are configured to cause the computer device to:
generate a report on the GUI, the report providing the indication of the data quality of the plurality of data elements, wherein the report provides a holistic view of data quality of the plurality of data elements.

3. The data management system of claim 2, wherein the report is generated via a single-click button.

4. The data management system of claim 1, wherein the instructions, when executed by the one or more processors, are configured to cause the computer device to:
identify one or more anomalies in the data elements that exceed a variance threshold; and
trigger a data validation failure when the one or more anomalies are identified.

5. The data management system of claim 1, wherein the plurality of data elements originates from different sources, and wherein the data management system simultaneously processes the plurality of data elements from the different sources.

6. The data management system of claim 1, wherein one or more rules are implemented to determine the metadata registration, the data quality, the evaluation of the data quality based on the plurality of data quality dimensions, or any combination thereof.

7. The data management system of claim 6, wherein determining the data quality comprises a schema validation based on the metadata registration.

8. The data management system of claim 1, wherein the plurality of data elements are evaluated daily, hourly, or both.

9. The data management system of claim 6, wherein the GUI displays a trend of data quality for the plurality of data quality dimensions.

10. The data management system of claim 1, wherein the instructions when executed by the one or more processors, are configured to cause the computer device to:
in response to the metadata registration for at least one of the plurality of data elements being invalid, remove the at least one of the plurality of data elements from the determination of the data quality of the plurality of data elements.

11. A method, comprising:
receiving, via a processor, an indication that a plurality of data elements are ready for evaluation;
determining, via the processor, whether metadata registration for the plurality of data elements is valid;
in response to the metadata registration being valid, determining, via the processor, a data quality of the plurality of data elements by providing the plurality of data elements to one or more data quality layers configured to evaluate a quality of values of the plurality of data elements based on a plurality of data quality dimensions comprising: validity, by determining whether the values conform to a specific format provided to the one or more data quality layers,
completeness, by determining whether the values conform to an expected level of comprehensiveness provided to the one or more data quality layers,
uniqueness, by determining whether the values are duplicated among the plurality of data elements,
accuracy, by comparing known information with the values for conflicts,
consistency, by determining whether the values match across different storage devices, and
timeliness, by determining whether the values are present at an expected time provided to the one or more data quality layers;
in response to the metadata registration being invalid:
cease processing of the plurality of data elements;
periodically re-determine whether the metadata registration is valid; and
determine the data quality of the plurality of data elements, when the metadata registration becomes valid;
providing, via the processor, an indication of the data quality of the plurality of data elements via a graphical user interface (GUI) generated via a centralized data mart on a user interface; and
generating, via the processor, a report on the GUI, the report providing the indication of the data quality of the plurality of data elements, wherein the report provides a holistic view of data quality of the plurality of data elements.

12. The method of claim 11, wherein one or more data elements of the plurality of data elements that are improperly registered are detected and remedied prior to providing the plurality of data elements for determining the data quality.

13. The method of claim 11, comprising:
identifying one or more anomalies in the data elements that exceed a variance threshold; and
triggering a data validation failure when the one or more anomalies are identified to provide early detection of data quality issues prior to providing the indication of data quality of the plurality of data elements.

14. The method of claim 13, wherein identifying the one or more anomalies uses machine learning.

15. The method of claim 11, wherein the report is generated via a single-click button.

16. The method of claim 11, wherein one or more rules are implemented to determine the metadata registration, the data quality, the evaluation of the data quality based on the plurality of data quality dimensions, or a combination thereof.

17. The method of claim 16, wherein the one or more rules comprise business rules, technical rules, or a combination thereof.

18. The method of claim 11, wherein the GUI displays a trend of data quality for the plurality of data quality dimensions.

19. One or more tangible, non-transitory, machine-readable media comprising instructions that, when executed by one or more processors of the machine, cause the machine to:
receive an indication that a plurality of data elements are ready for evaluation;
determine whether metadata registration for the plurality of data elements is valid;
in response to the metadata registration being valid, determine a data quality of the plurality of data elements, by
providing the plurality of data elements to one or more data quality layers configured to evaluate a quality of values of the plurality of data elements based on a plurality of data quality dimensions comprising:
validity, by determining whether the values conform to a specific format provided to the one or more data quality layers,
completeness, by determining whether the values conform to an expected level of comprehensiveness provided to the one or more data quality layers,
uniqueness, by determining whether the values are duplicated among the plurality of data elements,
accuracy, by comparing known information with the values for conflicts,
consistency, by determining whether the values match across different storage devices, and
timeliness, by determining whether the values are present at an expected time provided to the one or more data quality layers;
in response to the metadata registration being invalid:
cease processing of the plurality of data elements;
periodically re-determine whether the metadata registration is valid; and
determine the data quality of the plurality of data elements, when the metadata registration becomes valid;
identify one or more anomalies in the data elements that exceed a variance threshold to provide early detection of data quality issues;
trigger a data validation failure when the one or more anomalies are identified;
provide an indication of the data quality of the plurality of data elements via a graphical user interface (GUI) generated via a centralized data mart; and
generate a report providing the indication of the data quality of the plurality of data elements, wherein the report provides a holistic view of data quality of the plurality of data elements.

20. The one or more tangible, non-transitory, machine-readable media of claim 19, comprising instructions that, when executed by the one or more processors of the machine, cause the machine to:
generate the report in response to a single-click button.

* * * * *